United States Patent Office 3,028,936
Patented Apr. 10, 1962

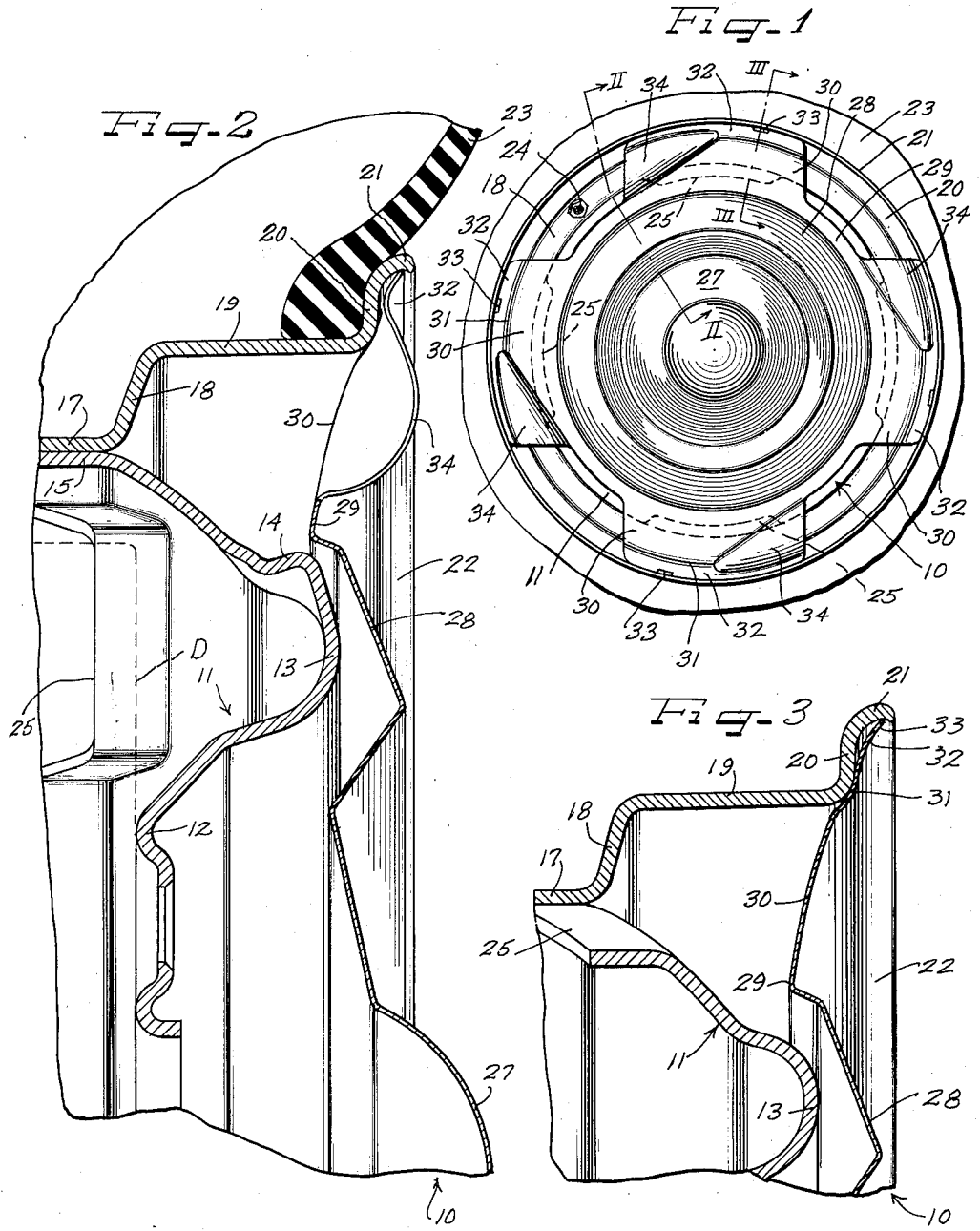

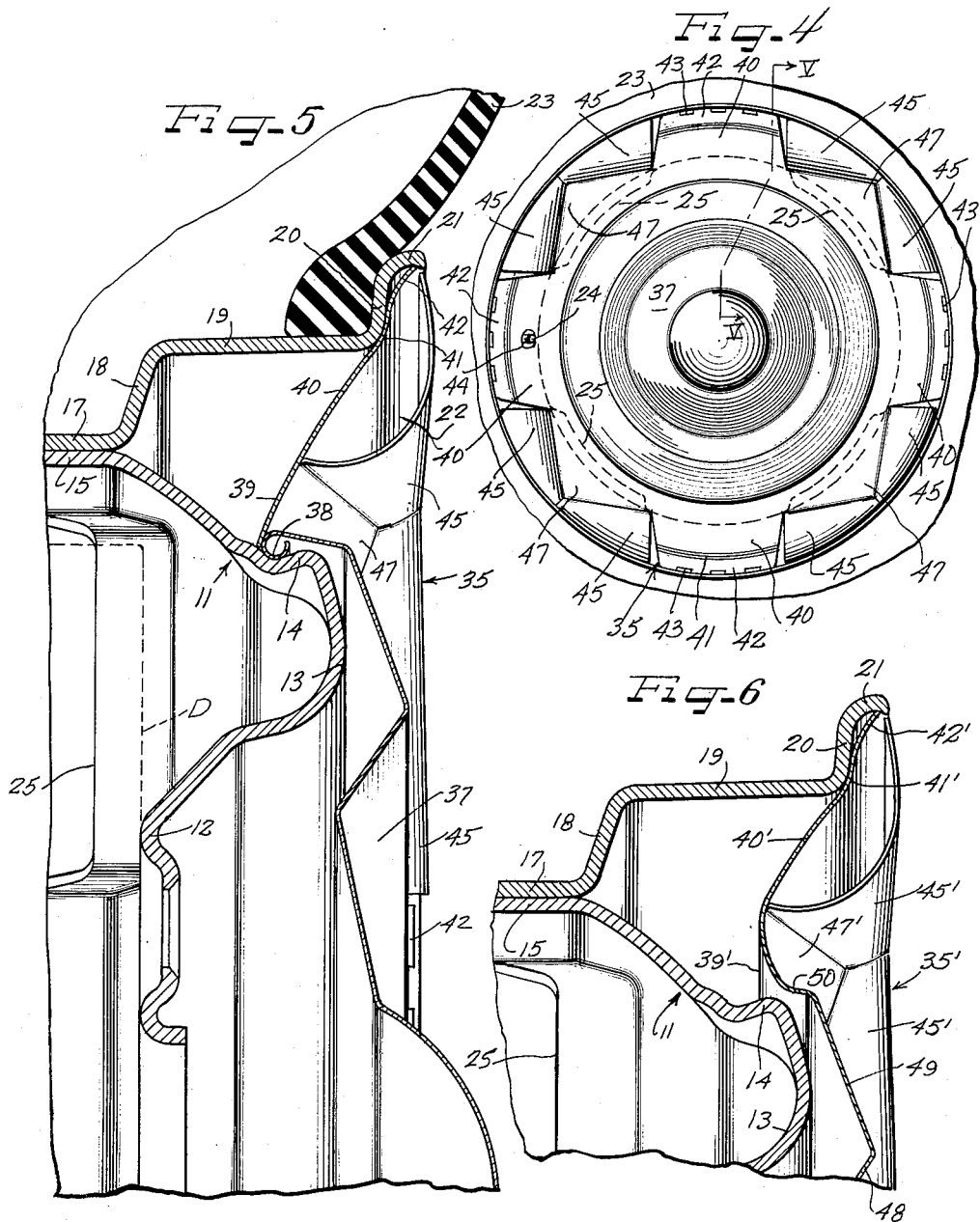

3,028,936
WHEEL STRUCTURE
George Albert Lyon, Detroit, Mich., assignor to Lyon Incorporated, Detroit, Mich., a corporation of Delaware
Filed Sept. 25, 1958, Ser. No. 763,253
9 Claims. (Cl. 188—264)

The present invention relates to improvements in wheel structures and more particularly concerns the covering of the outer sides of automobile wheels in a manner to afford air circulation through the wheel and cover and yet provide a desirable ornamental and protective relationship of the cover to the wheel.

A serious problem in the operation of automobiles equipped with small size wheels and large size balloon tires, coupled with high running speeds and heavy vehicle weights resides in overheating of the brakes. This problem has become aggravated as the original equipment sizes of the wheels have within recent times been progressively reduced from 15 inch diameter to 14 inch diameter, ever more crowding the available brake space within the wheel. Wheels of 13 inch diameter are at least in the planning stage by automobile manufacturers. In some instances where with the larger 15 inch wheel no openings through the wheel existed in certain lines of automobiles, such openings are now being specified with the smaller size wheels in order to afford circulation of air through the wheels for brake drum cooling. While this affords some relief from overheating of the brakes, air circulation promoting aid is desirable.

An important object of the present invention is to provide in a vehicle wheel structure having openings therethrough, improved cover means with novel air circulation promoting structure.

Another object of the invention is to provide an economy wheel cover with novel combination of cover retaining means and air circulation promoting means coactive with a wheel with which the cover is adapted to be assembled in press-on, pry-off relation.

A further object of the invention is to provide in a vehicle wheel structure having air circulation openings improved cover means for the outer sides of the wheel engageable in press-on, pry-off relation with the tire rim of the wheel and having novel air circulation promoting scoop structure cooperatively related to the tire rim for effectively promoting air circulation through the wheel.

A still further object of the invention is to provide improved wheel cover construction including a novel combination of peripheral cover retaining arm means and air circulation promoting scoop means.

Other objects, features and advantages of the present invention will be readily apparent from the following detailed description of certain preferred embodiments thereof taken in conjunction with the accompanying drawings, in which:

FIGURE 1 is an outer side elevational view of a vehicle wheel embodying features of the invention;

FIGURE 2 is an enlarged fragmentary radial sectional detail view taken substantially on the line II—II of FIGURE 1;

FIGURE 3 is a fragmentary enlarged radial sectional detail view taken substantially on the line III—III of FIGURE 1;

FIGURE 4 is an outer side elevational view of a modification;

FIGURE 5 is an enlarged fragmentary radial sectional detail view taken substantially on the line V—V of FIGURE 4; and FIGURE 6 is a fragmentary enlarged radial sectional detail view similar to FIGURE 5 but showing a modification of the cover structure of FIGURES 4 and 5.

Referring to FIGURES 1, 2 and 3, a cover 10 is constructed and arranged to be applied in protective and ornamental covering relation over the outer side of a vehicle wheel including a wheel body 11 having a central bolt-on flange 12 by which it is adapted to be secured to a vehicle axle structure including a brake drum D housed within the generally axially inwardly opening chamber recess provided by the wheel. About the bolt-on flange 12 is an annular generally axially outwardly projecting nose bulge 13 which may be provided on its radially outer side with a suitable circumferentially spaced series of generally radially outwardly projecting hub cap retaining bumps 14 for retaining a hub cap on the wheel optionally in place of the cover 10.

At its radially outer margin the wheel body 11 has an axially extending attachment flange 15 secured as by means of riveting or welding to a base flange 17 of a multi-flange, drop center tire rim including an outer side flange 18 facing generally axiallly outwardly and merging with an intermediate flange 19 which merges at its axially outer side with a terminal flange having a generally radially outwardly extending portion 20 and a generally axially outwardly turned lip 21 providing a generally radially inwardly opening annular groove 22. Supported by the tire rim may be a pneumatic tubeless tire 23. For inflating the tire, a valve stem 24 may be carried by the side flange 18 of the tire rim.

For air circulation through the wheel, the attachment flange 15 of the wheel body is provided at suitable circumferentially spaced intervals such as four with insets providing respective wheel openings 25, and the cover 10 is constructed to assist in and promote circulation of air through the openings. To this end, the cover 10 comprises a generally circular member which in this instance is in the form of a disk having a central crown portion 27 for overlying the bolt-on flange 12. About the crown portion 27 is an annular intermediate portion 28 of a diameter to overlie the nose bulge 13 and preferably sloping generally radially outwardly and axially inwardly to a generally L-shaped angular annular stiffening marginal flange structure including a generally radially outwardly extending and axially outwardly sloping extremity portion 29 of a diameter about equal to the diameter on which the insets providing the wheel openings 25 are formed.

For retaining the cover 10 on the wheel in press-on, pry-off relation, a plurality, herein four integral cover retaining arm extensions 30 from the perimeter of the cover margin 29 are provided to extend their ends to a slightly larger diameter than the inside diameter of the terminal flange portion 21 within the groove 22. As shown, each of the arms 30 is of a width comprising slightly more than one-eighth of the circumference of the cover and projects generally radially and axially outwardly to overlie the tire rim and engage the terminal flange of the rim.

Adjacent to its radially outer end, each of the arms 30 has extending across its width an axially outwardly indented transverse portion providing a seating groove 31 generally complementary to the juncture shoulder between the intermediate flange 19 and the terminal flange portion 20 and engageable therewith to determine the axially inward disposition of the retaining arms 20 and thereby the cover 10 relative to the wheel. It will also be noted that by virtue of the width of the respective arms 30, and the rib form of the seating portion 31, it provides a reinforcement for substantially stiffening the resilience of the arm in each instance, especially since the rib is of arcuate extent generally conforming to the circumferential curvature of the rim shoulder.

Radially outwardly beyond the rib shoulder 31 is provided a generally radially and axially outwardly projecting cover retaining terminal 32 on each of the arms 30 engageable at its edge extremity within the rim groove 22 with the terminal flange portion 21 in press-on, pry-off relation. Pry-off is facilitated by the provision of a notch 33 in the tip of the terminal 32 for reception of a pry-off tool (not shown) such as a screwdriver which can thereby be inserted into the notch 33 and then levered by fulcruming on the tip of the terminal flange portion lip 21 for flexing the retaining arm generally radially inwardly and thereby snap the terminal 32 out of engagement with the shoulder provided by the tip portion of the terminal flange lip 21.

By having the width of the cover retaining arms 30 at least as great as the width of the respective wheel openings 25, substantial concealment of the wheel openings can be effected by disposing the retaining arms 30 over the openings in assembly of the cover 10 over the outer side of the wheel, substantially as shown in FIGURE 1. In this relationship, the valve stem 24 is accessible through one of the gaps between adjacent ones of the arms 30. In addition, the gaps between the arms afford substantial air circulation passage openings communicating with the wheel openings 25.

Air circulation through the wheel is promoted by providing each of the retaining arms 30 on at least one side thereof, with a generally axially outwardly bulging and circumferentially opening air scoop 34. By preference, each of the air scoops 34 comprises an enlargement of the seating shoulder rib 31 and is of generally semi-funnel shape, opening from the adjacent side edge of the respective cover retaining arm and at its inner end converging toward and into the rib 31. Along the radially outer side of each of the scoops 34 is a continuation of the retaining terminal 32 of the retaining arm. At their mouth ends, the scoops 34 are preferably of a width to extend entirely between the between-arm edges of the marginal flange portion 29 of the cover and the scoop side extension portions of the arm terminals 32. This affords a generally pinwheel arrangement of the scoops 34 generally over one side of the underlying respective wheel openings 25 and over the tire rim adjacent to the perimeter of the wheel where the wheel travels at maximum speed during running rotation thereof so that the scoops will be of maximum air circulation promoting value in service.

Where the air scoops 34 are oriented to open in the direction of rotation of the wheel, they have a scooping effect to drive air scooped in thereby toward the respective wheel openings 25 and thus generally axially inwardly through the wheel. Where the air scoops 34 are oriented to open in the opposite direction from the direction of rotation, they have an aspirating effect by virtue of creating a vacuum therebehind in the rotation of the wheel to thus draw air generally axially outwardly through the wheel openings 25. Where a combination of scooping-in and aspirating effect is desired, each of the arms 30 may be provided with a pair of the scoops 34 facing in respectively opposite side directions relative to the arms. Of course, where the air scoops 34 are provided to open all in one direction, as shown in FIGURE 1, it may be desirable to provide left and right-hand covers wherein the air scoops will face in one circumferential direction on one of the covers and in the opposite circumferential direction on the other of the covers of each pair.

In applying the cover 10 to the outer side of the wheel, it is generally centered over the wheel and with the retaining arms 30 properly oriented relative to the wheel openings 25 and the valve stem 24. While two of the retaining arms 30 may be engaged at their terminals 32 within the retaining groove 22 of the tire rim in the initial placement of the cover, the remaining two arms will have the terminals 32 cammingly seated upon the tip of the terminal flange lip 21 and axially inward pressure will cause the same to flex and snap resiliently past the shoulder defined by the terminal flange lip and then engage under resilient thrusting tension within the groove 22. Removal of the cover is easily effected by inserting a pry-off tool into the pry-off notch 33 of one or more of the arms 30 to dislodge the retaining terminal 32 from the terminal flange shoulder. It will be appreciated that the retaining arms 30 are of substantial resilient stiffness afforded not only by the reinforcing rib 31 but the enlargements of the rib provided by the air scoops 34.

In the modification of FIGURES 4 and 5, a cover member 35 is provided in the form of a trim ring adapted to provide with a hub cap 37 the appearance, in assembly upon the wheel, of a full disk cover. Details of the wheel itself may be substantially the same as in FIGURES 1 and 2 and therefore identical reference numerals identify identical parts of the wheel. In this instance, the hub cap 37 is provided with a flexible resilient retaining bead 38 for snap-on, pry-off retaining engagement with the retaining bumps 14.

For coaction with the hub cap 37, the cover member 35 has a generally circular body portion 39 provided with an inner diameter to engage with the outer marginal structure of the hub cap and in this instance arranged to engage behind the retaining bead 38 as shown. Thereby, the hub cap assists in retaining the cover member 35 on the outer side of the wheel.

However, the cover member 35 is provided with means for self-retention on the wheel comprising a plurality of cover retaining arms 40, herein four in number and comprising generally radially and axially outwardly projecting extensions from the cover body 39, much the same as the retaining arms 30 of the cover 10, but in this instance substantially narrower so that the gaps between the arms are substantially wider than in the cover 10. In this instance, the gaps between arms are preferably at least as wide between the base ends of the arms 40 as the wheel openings 25 and preferably somewhat wider.

At their radially outer end portions, the retaining arms 40 have respective transverse generally axially outwardly projecting arcuate reinforcing ribs 41 which provide generally axially inwardly opening respective grooves for seating on the juncture between the intermediate flange 19 and the terminal flange portion 20 and resiliently reinforce the retaining arms. Radially outwardly beyond the ribs 41 the respective arms have retaining terminal portions 42 which preferably project generally radially and axially outwardly and normally extend to a slightly larger diameter than the inside diameter within the terminal flange groove 22 so as to engage in effective press-on, pry-off relation with the terminal flange, in a similar manner as described in connection with the retaining arms 30 of the cover 10. Pry-off notches 43 are formed in the terminal extremities 42. In the present instance, a plurality, such as three of the notches 43 may be provided so as to afford a plurality of corners at the edge of the retaining terminal 42 which will bite into the opposing surface of the terminal flange portion 21 and thus hold the cover against turning on the wheel in service and thus avoid distortion of the valve stem 24 which projects through a valve stem opening 44 preferably provided in one of the arms 40 as shown.

In applying the cover member 35 to the outer side of the wheel, the arms 40 are preferably oriented to be disposed between the wheel openings 25 so that the gaps between the arms are generally aligned with the wheel openings so that air circulation promoting generally semi-funnel shaped air scoops 45 adjacent the respective opposite sides of the arms 40 and integrally formed on between-arm radially outward extensions 47 on the cover member body 39 will effectively function to enhance air circulation through the wheel openings.

At their flaring mouth ends, projecting generally axially offset relative to the cover body 39, the scoops 45 are adjacent to the respective sides of the retaining arms 40, while at their inner smaller ends the air scoops converge in each pair. Along their radially outer sides, the air scoops 45 are dimensioned to coact closely with the tip portion of the terminal flange lip 21, thereby making the terminal flange a portion of the air scooping and funneling chamber by which air scooped in by the scoops 45 opening in the direction of rotation of the wheel is diverted toward the respected wheel openings 25. At their radially inner sides, the mouth ends of the scoops 45 are preferably substantially coincident with the base ends of the contiguous cover retaining arms 40.

Those of the air scoops 45 which open in the opposite direction from rotation of the wheel serve to aspirate air, and this is advantageous, especially at the rearmost side of the wheel as it is running and which rearmost side is, as is well known, moving at a slower speed starting from zero speed at the lower road engaging side of the wheel during each revolution, the upper and forwardly moving quadrant of the wheel moving at highest forward velocity in each revolution. As a consequence, air scooped in by the air scoops 45 in the high velocity quadrant is motivated with some velocity generally axially inwardly through the wheel openings for brake drum cooling, and air aspirated by the trailing air scoops of each set in the rear and lower quadrant of the wheel in each revolution assists in moving heated air from the wheel. There is thus an effective circulation of cooling air through and past the wheel and the brake brake drum D. The greater the rotary speed of the wheel, the more effective will such air circulation be, as is desirable since it is at high speeds of vehicle operation that the greatest danger of overheating occurs.

In ths modification of FIGURE 6, much the same construction is depicted as in FIGURES 4 and 5 except that a cover 35' is of the full disk type rather than of the trim ring type, thus eliminating a separate hub cap. To this end, the cover 35' includes as a portion of the body 39' a central crown portion 48 having thereabout an intermediate portion 49 which joins the outer marginal portion of the body 39' on a reinforcing angular juncture 50. Other features of the cover 35', and the wheel to which ti is applied are substantially the same as described in connection with the cover 35 and therefore primed reference numerals identify identical parts and the description of all such parts applying with equal effect with respect to the cover 35'.

In all forms thereof, the covers of the present invention are adapted to be made from thin sheet material such as stainless steel, brass, alunminum alloy and the like, which may be die pressed or drawn into shape and suitably finished as by polishing and plating. Since only a small number of die operations will complete information of the cover in each instance, and minimum size blanks of material can be used, the covers can be produced and sold at low cost.

Any form of the cover adapts itself readily to either full disk or trim ring type of construction.

It will be understood that modifications and variations may be effected without departing from the scope of the novel concepts of the present invention.

I claim as my invention:

1. In a wheel structure including a wheel body and a tire rim having a terminal flange with air circulation openings through the wheel adjacent juncture of the wheel body and the tire rim, a cover cember for disposition over the outer side of the wheel including a generaliy circular cover body having a plurality of circumferentially spaced retaining arm extensions projecting generally radially outwardly and engageable in press-on, pry-off relation with the terminal flange for retaining the cover over the outer side of the wheel, each of said arms having a generally semifunnel shaped air scoop with its mouth projecting generally axially outwardly from the arm and comprising one side of the arm for air motivating action in the rotation of the wheel to promote air circulation through said wheel openings.

2. In a wheel structure including a wheel body and a tire rim having a terminal flange with air circulation openings through the wheel adjacent juncture of the wheel body and the tire rim, a cover member for disposition over the outer side of the wheel including a generally circular cover body having a plurality of circumferentially spaced retaining arm extensions projecting generally radially outwardly and engageable in press-on, pry-off relation with the terminal flange for retaining the cover over the outer side of the wheel, each of said arms having a generally semi-funnel shaped air scoop with its mouth projecting generally axially outwardly from the arm and comprising one side of the arm for air motivating action in the rotation of the wheel to promote air circulation through said wheel openings, each of said arms having a reinforcing rib thereon extending across its width and the air scoops having inner ends thereof merging with said ribs and coating with the ribs to resiliently reinforce the respective arms.

3. In a wheel structure including a tire rim and a wheel body supporting the same and having air circulation openings therethrough, a cover member for disposition over the outer side of the wheel including a cover body for overlying the wheel body and having projecting generally radially outwardly from the cover body a plurality of circumferentially spaced cover retaining arms having terminals thereon engageable with the tire rim for retaining the cover in place on the wheel, said arms being of substantial width and having air scoops projecting generally axially therefrom and opening from and comprising one side of the arm in each instance and said air scoops having along the radially outer sides thereof extension portions of the arm terminals engageable with the tire rim, said air scoops being adapted to promote air circulation through the wheel openings in the running rotation of the wheel.

4. In a wheel structure including a wheel body supporting a tire rim having a terminal flange, the wheel body providing air circulation openings therethrough adjacent juncture with the tire rim, a cover member for disposition over the outer side of the wheel including a generally circular cover body having radially outwardly extending peripheral cover retaining arms engageable retainingly with the terminal flange and having spaces between the arms, the cover body having in said spaces generally radially outward projections provided with air scoops directed generally circumferentially and having their mouths generally adjacent the sides of respective arms, said air scoops having the radially outer sides thereof in air chamber coaction with the terminal flange.

5. In a wheel structure including a wheel body and a tire rim with generally circumferentially elongated wheel openings at juncture of the wheel body with the tire rim, a cover for disposition over the outer side of the wheel having a plurality of circumferentially spaced radially extending cover retaining arms retainingly engageable in press-on, pry-off relation with the tire rim, the space between arms being at least as great as the length of said openings, and generally radial projections from the cover body between said arms providing air scoops for promoting air circulation through the wheel openings, said air scoops being by pairs opening in circumferentially opposite directions and having inner ends thereof merging adjacent to the tire rim.

6. A wheel cover member for disposition over the outer side of a vehicle wheel in ornamental and protective relation and adapted to promote circulation of air through openings in the wheel, a circular cover member body having projecting radially therefrom a circumferentially spaced plurality of cover retaining arms which are of substantial radial as well as circumferential dimension and having substantial portions thereof in generally circumferential alignment and provided with retaining terminals engageable with a confronting annular surface of a wheel in retaining press-on, pry-off relation, the arms being at least adjacent to said terminals resiliently axially flexible and radially deflectable when in retaining engagement with the wheel portion, and air scoops carried by the cover member and having scoop mouth ends disposed closely adjacent to the ends of the retaining arms and with the scoop mouth ends facing circumferentially so as to effect circulation of air in a generally axial direction through the cover and the wheel openings upon rotation of the cover member with the wheel.

7. A wheel cover member as defined in claim 6 wherein the cover member body has portions thereof located between said arms and extending substantially the length of the spaces between the arms and said air scoops are provided as integral structure on said portions between the arms.

8. A wheel cover member as defined in claim 6 wherein said air scoops are constructed as integral portions of said arms with the scoop mouth ends opening from the sides of the respective arms.

9. In a wheel structure including a tire rim and a wheel body supporting the same and providing air circulation openings therethrough for cooling a brake drum with which the wheel may be associated, a cover for disposition over the outer side of the wheel including a circular cover body of smaller diameter than the tire rim and having generally radially outwardly extending retaining arms thereon engageable in press-on, pry-off relation with an extremity flange of the tire rim, and air scoops carried by the cover and having generally circumferentially opening scoop mouth ends thereof disposed closely adjacent to the ends of respective retaining arms, said air scoops being carried by portions of the cover between the arms extending substantially the length of the spaces between the arms.

References Cited in the file of this patent

UNITED STATES PATENTS

| D. 103,682 | Kerr | Mar. 23, 1937 |
| 1,958,484 | Lyon | May 15, 1934 |
| 2,143,950 | Kliesrath | Jan. 17, 1939 |
| 2,312,159 | Gulotta | Feb. 23, 1943 |
| 2,633,944 | Butterfield | Apr. 7, 1953 |
| 2,659,459 | Lyon | Nov. 17, 1953 |
| 2,682,937 | Lyon | July 6, 1954 |
| 2,701,037 | Lyon | Feb. 1, 1955 |
| 2,754,942 | Lyon | July 17, 1956 |
| 2,808,908 | Lyon | Oct. 8, 1957 |
| 2,847,096 | Lyon | Aug. 12, 1958 |
| 2,851,131 | Hibbard | Sept. 9, 1958 |
| 2,857,023 | Lyon | Oct. 21, 1958 |

FOREIGN PATENTS

| 524,139 | Canada | Apr. 24, 1956 |